United States Patent [19]
Gildemeister

[11] 3,727,295
[45] Apr. 17, 1973

[54] METHOD OF MANUFACTURING FOAM FILLED METAL BAT

[75] Inventor: A. Donald Gildemeister, Toledo, Ohio

[73] Assignee: N L Industries, Inc., New York, N.Y.

[22] Filed: Sept. 15, 1971

[21] Appl. No.: 180,555

[52] U.S. Cl. ............29/455, 29/460, 29/472.9, 29/527.3, 264/45, 273/72 A
[51] Int. Cl. ............B21d 39/00, B23p 19/04
[58] Field of Search............29/460, 527.1, 527.3, 29/455, 472.9; 273/72 A, 72 R; 264/41, 45

[56] References Cited

UNITED STATES PATENTS

| | | | |
|---|---|---|---|
| 1,499,128 | 6/1924 | Shroyer | 273/72 A UX |
| 1,611,858 | 12/1926 | Middlekauff | 273/72 R |
| 2,340,156 | 1/1944 | Taylor et al | 273/72 R |
| 2,753,642 | 7/1956 | Sullivan | 264/41 UX |
| 2,910,730 | 11/1959 | Risch | 264/45 |
| 3,095,644 | 7/1963 | Curry | 29/460 |
| 3,313,020 | 4/1967 | Krauskopf | 29/460 X |
| 3,446,361 | 5/1969 | Douty | 29/460 X |
| 3,479,030 | 11/1969 | Merola | 273/72 R |

Primary Examiner—Charlie T. Moon
Attorney—Robert L. Leham et al.

[57] ABSTRACT

A foam filled metal bat and method for making same are disclosed. The bat comprises a die cast, ball-bat shaped hollow tube of substantially uniform wall thickness having an integrally cast knob over an end of a handle portion. The end of a club portion of the tube is open. A rigid urethane foam extends within the tube from the knob end up to and contiguous with a cap inserted in the open club end. The rigid foam forms a bond with the tube walls and the cap portion which may be a semi-rigid urethane foam or a rubber plug. The method comprises the steps of casting the tube, inserting the cap portion and placing the rigid urethane foam within the tube to form a rigid, lightweight unitary structure. A method and means are also disclosed for locating the center of percussion of the bat in which foams of different densities are placed in the bat.

1 Claim, 4 Drawing Figures

PATENTED APR 17 1973  3,727,295
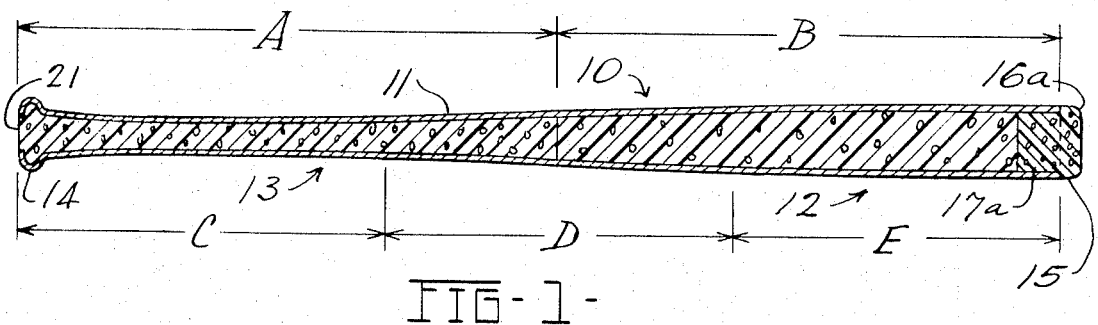
FIG-1-
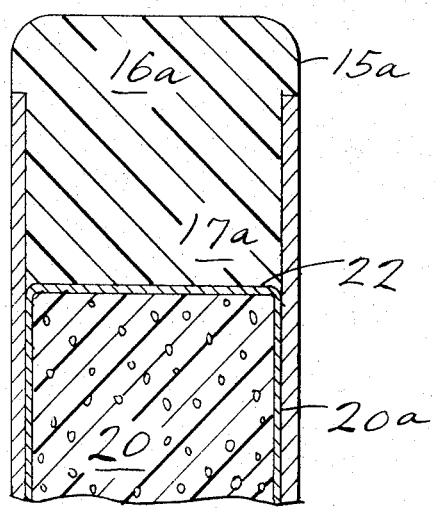
FIG-2-
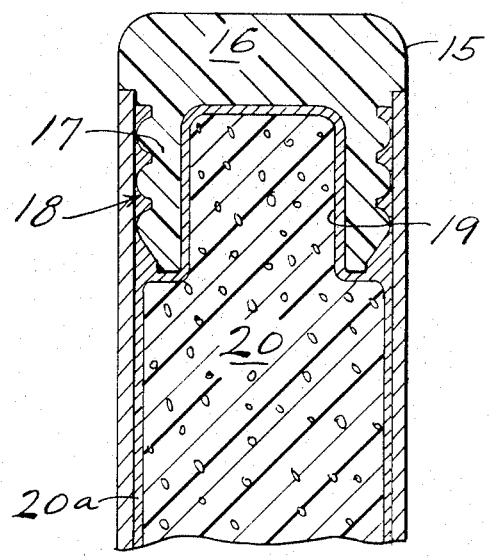
FIG-3-
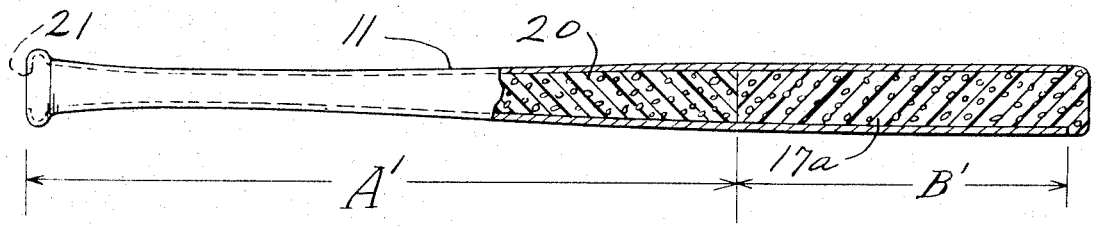
FIG-4-
INVENTOR:
A. DONALD GILDEMEISTER
BY
ATTYS.

METHOD OF MANUFACTURING FOAM FILLED METAL BAT

BACKGROUND OF THE INVENTION

Metal ball bats, such as those approved for use by the Amateur Softball Association, are advantageous over wooden bats because they do not chip, crack or split. A metal bat, however, is inherently subject to denting upon impact with a baseball or softball. Furthermore because the bats are generally hollow and tubular in shape, vibrations within the bat handle as well as objectionable sounds will be created upon impact with a ball.

Prior art metal bats such as those disclosed in U.S. Pat. Nos. 1,499,128 to Shroyer, 1,611,858 to Middlekauff and 3,479,030 to Merola, have provided various means for eliminating these inherent problems with metal bats. Generally the provision of rubber sound deadening clubs, reinforcing sleeves and wooden handle inserts have been provided in order to simulate the impact characteristics of wooden bats. Several problems remain unsolved with these prior art bats. For example, it has been found that deformation of the bat under relatively high impact with a ball often causes dislodging of rubber plugs placed in the bat end as sound deadening devices and strengthening members. It has also been found that the use of an insert within the bat tube alone does not adequately strengthen the bat against shocks caused by vibrations.

The present invention provides a means of solving the above mentioned problems by use of expanded foam within the hollow bat-shaped tube. The foam bonds with the metal tube as well as the cap portion to provide a resilient and extremely strong unitary structure.

SUMMARY OF THE INVENTION

The invention is a foam filled metal bat comprising a die cast generally elongate metal tube of substantially uniform wall thickness having a club end of one diameter and a handle end of reduced diameter. A rigid expanded foam core, such as urethane foam, is placed within the hollow elongate tube extending from an integrally cast knob portion on the handle end of the bat to a plug in an open end in the club portion of the bat. The core forms a rigid bond between the interior bat walls and the plug. The plug can be a rubber fitting having a cap portion whose outside diameter is equal to the outside diameter of the club portion and a hollow plug portion extending axially within the tube. The rubber plug portion is cleated on the exterior surface with respect to the wall of the tube and has a smooth hollow inner surface. When foam is placed around the area of the plug, a bond is formed between the rubber plug and the foam to form a unitary structure. A second embodiment of the invention utilizes a molded semi-rigid urethane foam plug having a cap portion whose outside diameter is equal to the outside diameter of the open club end and a solid plug portion extending within the tube and bonded to the rigid urethane foam. The preferred foams for use in the second embodiment are of significantly different densities. The center of balance of the bat structure may thereby be predetermined by proportioning the respective amounts of rigid and semi-rigid foams within the bat-shaped tube.

BRIEF DESCRIPTION OF THE DRAWINGS

FIG. 1 is a longitudinal sectional view of a foam filled metal bat embodying the present invention;

FIG. 2 is a longitudinal section of a club end of one embodiment of the foam filled metal bat of the present invention;

FIG. 3 is a longitudinal section of a club end of a second embodiment of a foam filled metal bat of the present invention; and FIG. 4 is a longitudinal section of a foam filled metal bat of the present invention showing two different foams of different densities therein.

DESCRIPTION OF THE PREFERRED EMBODIMENTS

Referring to FIG. 1, a foam filled metal bat 10 comprising a die cast, elongate hollow metal tube 11 is shown. The tube 11 is preferably of a magnesium alloy and has a club portion 12 and a handle portion 13 with an integral knob 14 on the end of the handle portion 13. The tube 11 is cast to form a uniform wall thickness throughout. A plug 15 is inserted in an open end of the club portion 12. In one embodiment of the invention, as shown in FIG. 3, the plug 15 comprises a rubber fitting having a cap portion 16 whose outside diameter is equal to the outside diameter of the club portion 12 and an axially extending tubular insert portion 17 having a cleated or ribbed outer surface 18 opposite the inner wall of the tube 11 and a hollow inner surface 19. A rigid urethane foam core 20 extends within the tube 11 from the integral knob 14 to and around the plug 15.

It has been found that any of the several types of foams are suitable for the present invention and that rigid urethane foams are especially suitable. These foams are generally formed by the use of various polyols and catalysts under various reaction conditions. Density of the rigid foam generally ranges from 12 to 15 pounds per cubic foot. The resulting rigid foam core 20, while being fairly lightweight, has sufficient compression resistance to withstand the shock of impact, and is capable of bonding itself to areas within the tube 11. Since rigid urethane foam also readily foams in place in a closed cavity, the reactive liquid will rapidly flow into the bat 10 and foam to fill all areas to form a strong, seamless core.

A preferred foam for use in the present invention is a rigid urethane foam having an integral skin. The foam system forms its own skin, generally designated by reference numeral 20a in FIGS. 2 and 3 which precisely conforms to the mold surface defined by the interior of the tube 11. The rigid skin is virtually bubble-free and forms a sandwich core structure of a lower density core within the bubble-free skin.

Thus the outer skin 20a is a reinforcing layer of relatively high density, strong and impact resistance material adjacent the inner wall of the tube 11 backed up by the core of less dense but shock absorbing foam. The lower density inner core within the bubble-free skin includes a number of trapped air cells to provide sound deadening means for the bat structure.

The rigid foam is molded within the tube 11 to form the core 20 after the rubber plug 15 is inserted into the open end of the club portion 12. The reactive liquid is injected in the tube 11 through an opening 21 in the knob 14. The expanding foam flows around the cleated outer surface 18 and the hollow inner surface of the insert portion 17 to form a bond with the plug 15. Once the foam core 20 has cured and solidified, the tube 11 and the plug 15 are bonded into a rigid unitary structure.

Referring to FIG. 2, a second embodiment of a foam-filled metal bat of the invention is shown. In this embodiment, the plug 15a comprises a molded-in-place, semi-rigid, resilient fitting having a cap portion 16a whose outside diameter is equal to the outside diameter of the club portion 12 and a solid, axially extending insert portion 17a extending within the open end of the club portion 12 to the rigid urethane foam core 20. A bond between the rigid core 20 and the plug 15a is formed along the interface 22 between the insert portion 17a and the core 20.

The preferred resilient semi-flexible foams for use in this embodiment have high load bearing properties but relatively low densities. This is necessary because the bats are often dropped or intentionally pounded on their ends so that a resilient plug is required. The plug is installed by molding it in place. Molding can be accomplished either by first pouring and molding the integral-skin, rigid core 20 and then pouring and molding the semi-rigid urethane plug 15a in place or vice versa.

Because of the difference in densities of the semi-rigid foam plug 15 and the integral-skin rigid urethane foam core 20, the center of balance or thus the center of percussion of the bat structure 10 can be determined by proportioning the relative lengths of the insert portion 17a and the core portion 20. Thus, if the plug 15 is comprised of a heavier foam than the core 20, by lengthening the axial length of the plug 15 the center of percussion can be moved a predetermined distance towards the plug end of the bat 10. If the difference in densities is reversed, the opposite effect, of course, takes place. For example, in FIG. 4, the insert portion 17a of the plug 15 extends axially from the club end of the bat 10 well into the tube 11 so that the center of percussion will be moved substantially to the left as represented by the relative lengths of portions A and B assuming that the foam comprising the plug 15 is less dense than the foam comprising the core 20. This enables the manufacturer to provide a series of bats with the same external shell but having a variety of balance characteristics.

It is to be understood that the present invention contemplates the use of any suitable expandable foam to form the core 20 and plug 15 elements which will lend the qualities of high resistance to impact, deformation, and breakage to the metal bat structure of the invention. Selection of the particular foams and the manner of their installation will be apparent to those skilled in the art.

Various obvious modifications from the above described preferred embodiments may be made without departing from the scope of the following claims.

What is claimed is:

1. A method of manufacturing a foam-filled metal bat comprising the steps of:
   die casting a generally elongate metal tube of uniform wall thickness having a club end of one diameter and a handle end of a reduced diameter, an opening in said handle end and an open portion in an end of said club end;
   placing a rubber plug, having a ribbed outer surface adjacent a wall of said club end, in said open portion;
   filling said elongate tube with a rigid urethane foam; and
   forcing said urethane foam between said wall of said club end and the outer surface of said rubber plug to form a bonding relationship between said plug and said foam for forming a high impact resistive unitary structure.

* * * * *